Figure 1:
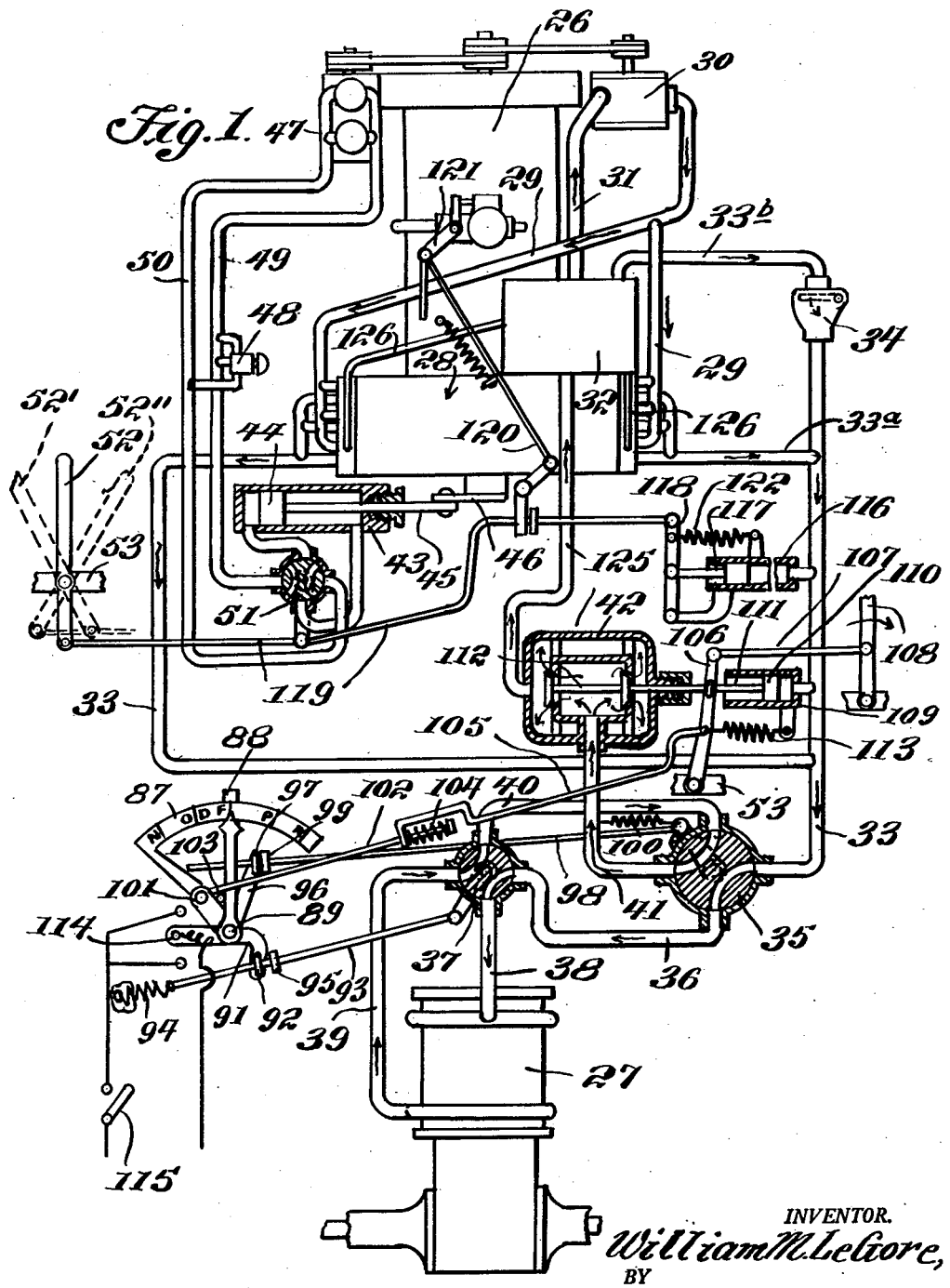

Dec. 17, 1957  W. M. LE GORE  2,816,507
VARIABLE STROKE FLUID DRIVE MECHANISM
Filed May 17, 1955  5 Sheets-Sheet 1

INVENTOR.
William M. LeGore,
BY
McMorrow, Berman & Davidson
ATTORNEYS

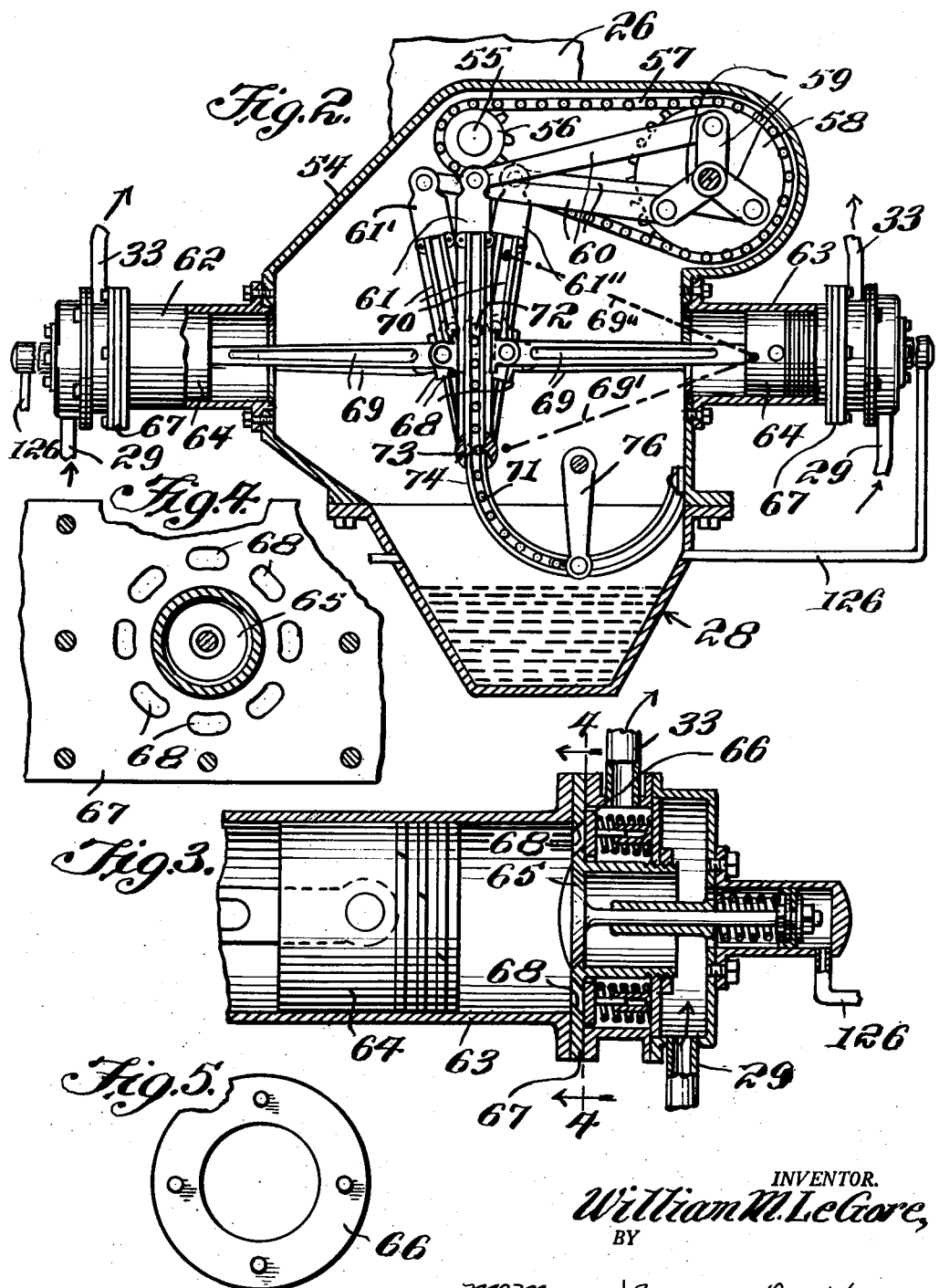

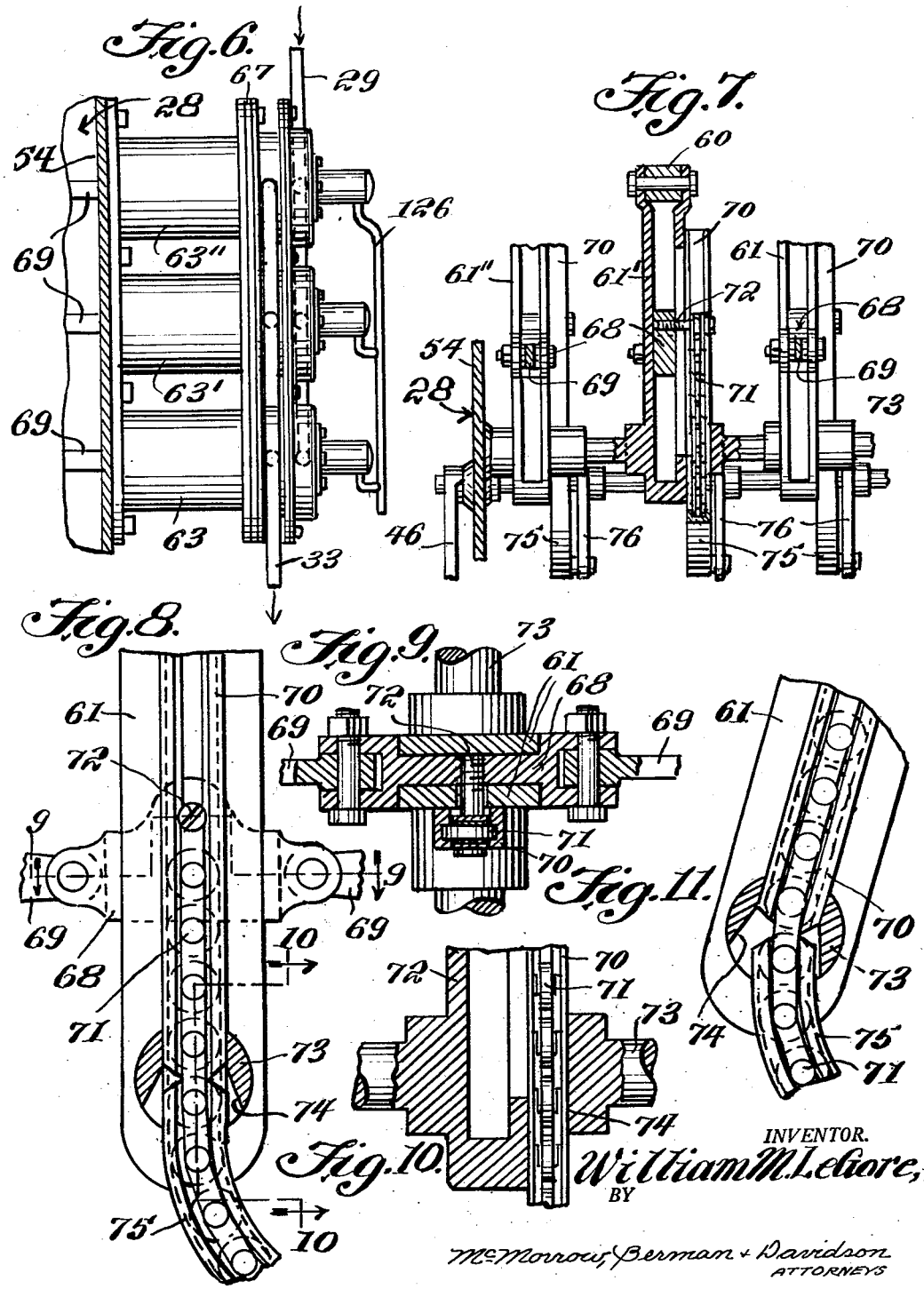

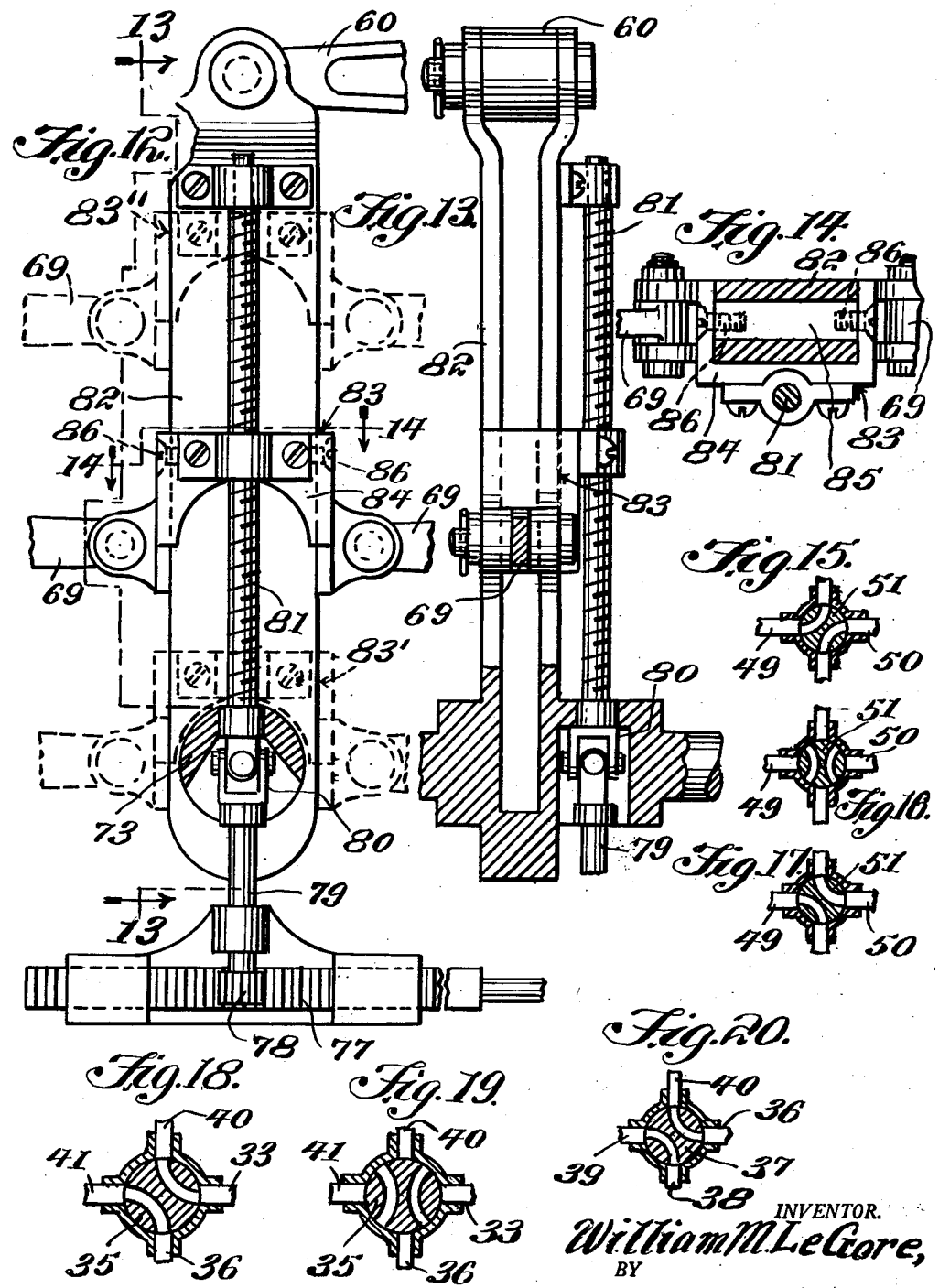

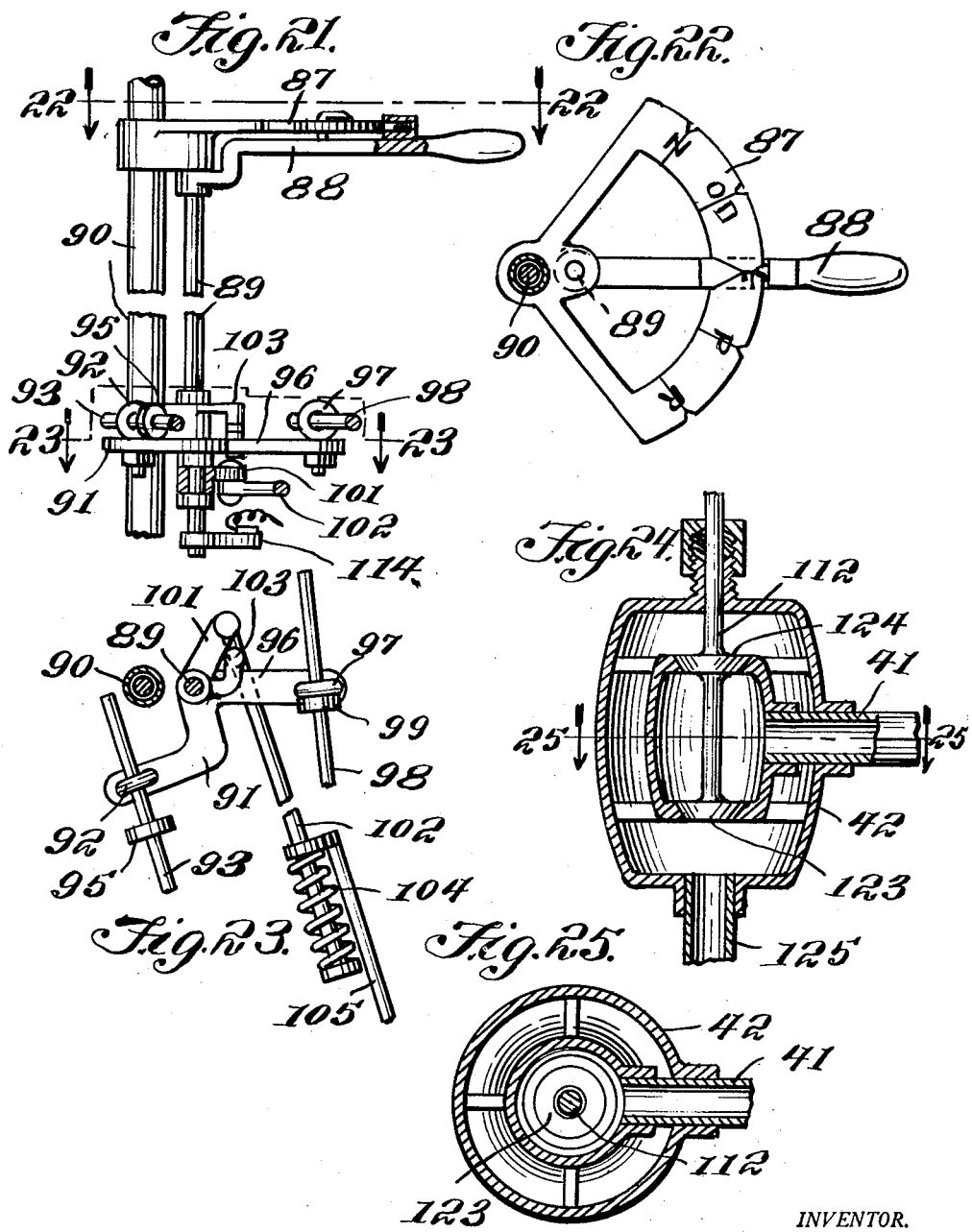

United States Patent Office 2,816,507
Patented Dec. 17, 1957

2,816,507

VARIABLE STROKE FLUID DRIVE MECHANISM

William M. Le Gore, Jefferson, Iowa

Application May 17, 1955, Serial No. 508,848

1 Claim. (Cl. 103—16)

The present invention relates to a variable stroke fluid drive mechanism.

The primary object of the present invention is to provide a variable stroke fluid drive mechanism for a vehicle having fluid motors connected to the vehicle wheels.

Another object of the present invention is to provide a drive mechanism for a vehicle and one having an infinite number of gear ratios connecting the engine to the driven wheels.

A further object of the present invention is to provide a fluid drive mechanism for an automotive vehicle which automatically shifts into a lower gear ratio when the vehicle starts up a hill or encounters other resistance.

A still further object of the present invention is to provide a fluid drive mechanism for an automotive vehicle or other driven machinery and one in which there is a control valve permitting locked operation such as parking, reverse operation, overdrive operation, and neutral or free-wheeling operation allowing the vehicle to be towed or pushed.

These and other objects and advantages of the present invention will be fully apparent from the following description when taken in connection with the annexed drawings, in which:

Figure 1 is a schematic view of the components of the present invention in use as a fluid drive mechanism of a vehicle, Figure 2 is an end view in cross-section of the variable stroke fluid drive mechanism of the present invention, Figure 3 is a detailed view of the valve head portion of the compressor cylinder of the present invention, Figure 4 is an end view on line 4—4 of Figure 3, Figure 5 is a plan view of the valve plate of the present invention, Figure 6 is a fragmentary top plan view of the present invention showing three of the opposed cylinders, Figure 7 is a detailed side view of the mechanism for varying the piston stroke, Figure 8 is a greatly enlarged detailed view partially in cross-section of the mechanism for varying the piston stroke, Figure 9 is a vertical view in cross-section on line 9—9 of Figure 8, Figure 10 is an end view in cross-section on line 10—10 of Figure 8, Figure 11 is a view similar to Figure 8 showing the chain portion of the present invention permitting the rocking movement of the levers connecting the engine to the pistons, Figure 12 is an end view of another mechanism for shifting the connecting rod of the piston to vary the length of the stroke of the piston, Figure 13 is a side view on line 13—13 of Figure 12, Figure 14 is a vertical view on line 14—14 of Figure 12, Figure 15 is a detailed view of the control valve of the present invention showing its position increasing the stroke of the piston, Figure 16 shows the valve of Figure 15 holding the piston stroke in its adjusted position, Figure 17 shows the position of the valve to decrease the length of the piston stroke, Figure 18 shows the drive control valve in reverse position opposite to that shown in Figure 1, Figure 19 shows the drive control valve in braking position, Figure 20 shows another control valve in a position permitting free-wheeling, Figure 21 is a fragmentary side view in elevation showing the control pedestal and lever, Figure 22 is a vertical view showing the markings on the control lever plate as seen on line 22—22 of Figure 21, Figure 23 is a vertical view on line 23—23 of Figure 21, Figure 24 is a side view in cross-section of the braking valve, and Figure 25 is a vertical view in cross-section on line 25—25 of Figure 24.

Referring in greater detail to the drawings in which like numerals indicate like parts throughout the several views, the present invention consists of a variable stroke fluid drive mechanism operatively connecting an engine indicated by the reference numeral 26 in Figure 1 to a fluid motor indicated by the reference numeral 27.

The variable stroke fluid drive mechanism of the present invention is indicated in Figure 1 by the reference numeral 28 and consists of a plurality of opposed compressor cylinders connected by a conduit 29 to a supercharger pump 30 operatively driven by the engine 26. The pump 30 is connected by conduit 31 to the tank 32 which acts as a reservoir for the driving fluid. The variable stroke fluid drive mechanism 28 supplies drive fluid under pressure through a branch conduit 33a and main conduit 33 to a drive control valve 35. A bypass conduit 33b connects the reservoir 32 to the main conduit 33, the conduit 33b having a check valve 34 therein. The bypass conduit 33b permits the fluid motor 27 to draw fluid from the reservoir 32 when the motor 27 is acting as a pump. The check valve 34 in the bypass conduit 33b prevents flow of fluid from the main conduit 33 to the reservoir 32.

In the position shown in Figure 1 the drive control valve 35 permits the flow of the drive fluid through the conduit 36 to another control valve 37 into the inlet conduit 38 connected to the fluid motor 27. An outlet conduit 39 returns the drive fluid through the control valve 37 and by means of conduit 40 returns the drive fluid to the drive control valve 35 from where it flows through the conduit 41 into the braking valve 42. From the braking valve 42 the drive fluid returns to the tank 32 by means of conduit 125.

Referring momentarily to Figures 18 and 19, in the former it will be seen that the drive control valve 35 has been moved to a position at which the drive fluid flows from the conduit 33 to the conduit 40 to the fluid motor 27 for a reverse operation of the latter returning from the fluid motor by way of the conduit 36 which is connected to the conduit 41.

In Figure 19, the valve has been turned so that fluid will not flow through either of the branch conduit 33a and main conduit 33, or conduit 36, or through conduits 40 and 41. This acts as a brake locking the vehicle in a condition such as parking.

In Figure 20 the control valve 37 has been turned to a position opposite to that shown in Figure 1 permitting the drive fluid within the fluid motor 27 to circulate freely independently of the rest of the fluid in the system, permitting free-wheeling of the vehicle, or towing or pushing of the vehicle.

Returning to Figure 1, a control cylinder 43 is seen to have a piston 44 working within and connected to one end of the connecting rod 45, the connecting rod 45 being connected by its other end to one end of the crank 46.

The control cylinder 43 is supplied with fluid under pressure from a second pump 47 operatively driven by the engine 26, an automatic by-pass valve 48 maintaining the pressure of the fluid in the conduits 49 and 50 at a constant level.

A control valve 51 controls the flow of the fluid from the conduits 49 and 50 into the opposed ends of the control cylinder 43.

A control lever 52 is pivotally mounted upon the vehicle frame 53 and is operatively connected to the control valve 51 by means of link 119. When the control lever 52 is moved to the dotted line position indicated by the reference numeral 52' in Figure 1, the control valve 51 is moved to the position shown in Figure 15 to admit the fluid to one end of the control cylinder 43 to increase the stroke of the piston within the variable stroke fluid drive mechanism 28, as will be described later.

When the control lever 52 is moved to the position shown in dotted lines and indicated by the reference numeral 52" in Figure 1, the control valve 51 is moved to the position shown in Figure 17 to decrease the stroke in the variable stroke fluid drive mechanism 28. As shown in Figure 1 and Figure 16, the control valve 51 is in a neutral or holding position.

Referring to Figures 2 to 11, inclusive, a fragmentary portion of the engine 26 is shown in Figure 2 and the variable stroke fluid drive mechanism is shown to include a casing 54 into which projects the end of the drive shaft 55 of the engine 26 which is connected by means of a gear 56 and a drive chain 57 to a larger drive gear 58.

A crank 59 is carried on the gear 58 and is operatively connected to one end of an arm 60 which has its other end connected to the free end of an operating lever 61. The lever 61 has its other end pivotally connected to the casing 54 for swinging movement between and toward and away from the cylinders 62 and 63.

Referring to Figure 6, it will be seen that the variable stroke fluid drive mechanism 28 may be constructed with three cylinders on each side, the right hand side being shown in Figure 6 and the cylinders indicated by the reference numerals 63, 63', and 63".

In Figure 2, only the end cylinders 62 and 63 are shown and three operating levers 61, 61', and 61" are shown in end view and illustrate the swinging or rocking movement, there being an arm 60 for each of the operating levers and a crank 59 for each of them also.

A piston 64 works in each of the cylinders to pump the drive fluid received from the conduit 29 to the branch conduit 33a and main conduit 33, there being a large centrally positioned intake valve 65 and a ring outlet valve 66 in the head of each cylinder. The valve plate 67 is shown to have a plurality of openings as shown in end view in Figure 4 and indicated by the reference numeral 68, over which is positioned the ring outlet valve 66 shown in plan view in Figure 5.

Referring to Figure 2, and to Figures 6 to 11, inclusive, the means for varying the stroke of the piston 64 in its associated cylinder is shown and includes a sliding element 68 on each of the operating levers, each having a pivotal connection with the one end of a piston rod 69 which has its other end pivotally connected to the piston 64.

On one side of the operating lever 61 is provided a guide 70 in which slides a flexible chain 71, the upper end of the chain is anchored by the bolt 72 to the sliding element 68. The guide 70 moves with its associated operating lever during the swinging movement of the latter.

The shaft 73 by means of which the operating levers are pivotally connected to the casing 54 is provided with a slot 74, as seen in Figures 8, 10, and 11, through which passes the chain 71 from the moving guide 70 to a fixed guide 75 supported upon the casing 54.

The chain 71 has its other end connected to a crank 76 supported on the wall of the casing 54 and operatively connected to the crank 46 shown in Figure 1.

Movement of the piston 44 within the control cylinder 43 will therefore be seen to effect the raising and lowering of the slide element 68 on each of the operating levers 61. In Figure 2, the reference numeral 69' indicates the position of the piston rod 69, shown in dotted lines, when the sliding element 68 has been lowered to zero stroke position, the operating levers 61 continuing to swing within the casing but having no effect upon the piston rods 69 in this position. Also seen in Figure 2 is the dotted line position 69" which indicates the position of the piston rod 69 during the maximum stroke of the piston.

In Figures 12 to 14, inclusive, a second embodiment of the present invention is shown, and substituting for the chain 71 and its guides and crank 76 is a rack 77 in mesh with a gear 78 on the lower end of a shaft 79. A universal joint 80 connects the shaft 79 with a threaded shaft 81 rotatably carried on each of the operating levers 82 in this embodiment.

A slide element 83 having a threaded bore is carried upwardly and downwardly by the shaft 81 on each of the operating levers 82 in response to movement of the rack 77, the latter being directly or through suitable gearing connected to the connecting rod 45 shown in Figure 1.

In Figure 12, the position of the slide element 83 is shown in full lines for a medium stroke of its associated piston and is shown in dotted lines indicated by the reference numeral 83' for a zero stroke position and in dotted lines indicated by the reference numeral 83" for a maximum stroke position. Each of the operating levers 82 in the second embodiment are similarly connected to the piston rods 69 and to the arms 60 to effect the driving of the pistons by the engine 26. In a preferred form of construction the operating lever 82 is bifurcated as shown in Figures 13 and 14 and the slide element 83 has a base 84 of U-shape with a central plug 85 secured to it by means of the bolts 86. Each slide element 83 is pivotally connected to the casing for swinging movement between and toward and away from the opposed cylinders 62 and 63 which project transversely of the casing intermediate the ends of the latter.

Referring to Figures 21 to 23, inclusive, the control pedestal and control lever mechanism is shown, with a plate 87 having indicia representing "neutral," "overdrive," "forward," "park," and "reverse."

An operating lever 88 swings over the plate 87 and is connected to the upper end of a control shaft 89 supported by the steering column 90 of the vehicle in which the variable stroke fluid drive mechanism of the present invention is installed.

As shown somewhat schematically in Figure 1 and in side and plan views in Figures 21 and 23, respectively, a first arm 91 is fixedly secured to the shaft 89 and has an eye-formation 92 through which extends the rod 93 connected to the control valve 37. A spring 94 biases the rod 93 to move the control valve 37 to the position shown in Figure 1, but on movement of the lever 88 to the left to the "neutral" or "N" position, the eye-formation 92 bears against a stop 95 on the rod 93 to turn the valve 37 to a position shown in Figure 20 permitting free-wheeling of the vehicle and allowing the vehicle to be towed or pushed.

Another arm 96 is fixed to the shaft 89 and has a similar eye-formation 97 receiving a rod 98 having a stop 99 engaged by the eye-formation 97 when the lever 88 is moved to the right. A spring 100 maintains the drive control valve 35 in the forward driving position, as shown in Figure 1, but movement of the lever to the "parking" or "P" position shifts the drive control valve 35 to the position shown in Figure 19.

Further movement of the lever 88 to "reverse" or "R" position shifts the valve to the position shown in Figure 18, the drive fluid then operating the fluid motor 27 in reverse.

Another lever or arm 101 is pivoted loosely on the shaft 89 and is connected to a rod 102. A stop 103 fixedly secured to the shaft 89 picks up the arm 101 when the lever 88 is swung to the "overdrive" or "OD" position, exerting a pull on the rod 102 to compress the spring 104, pulling with it an overdrive control rod 105.

The overdrive control rod 105 is connected to a lever 106, one end of which is pivotally connected to the frame 53 of the vehicle and the other end of which is connected by linkage 107 to a brake pedal 108. A power cylinder 109 has a piston 110 and a piston rod 111 connected to the valve stem 112 in the braking valve 42.

When the lever 88 is in the "overdrive" position, the lever 106 is pulled to open the braking valve 42 to its wide open position. When the lever 88 is in the "forward" or "reverse" position, the spring 113 pulls the lever 106 to a position at which the connected valve 42 is balanced.

The power cylinder 109 has one end in circuit with the drive fluid in the main conduit 33 and when the vehicle goes down the hill in either the "forward" or "reverse" position, the fluid motor acts as a pump and reduces the pressure of the drive fluid in the main conduit 33, causing the valve 42 to tend to close and exerting a braking action to the flow of the drive fluid therethrough. With the lever 88 in the "overdrive" position, the spring 104 overcomes the pressure reduction in the main conduit 33 and permits the vehicle to roll free of any braking action.

A switch arm 114 is connected to the lever 88, and when the lever 88 is in either the "parking" or the "neutral" position, the switch arm closes the circuit, including the starter switch 115, permitting the starting of the vehicle's engine 26. In any other position of the lever 88, the circuit to the starter switch 115 is broken.

Also connected to the conduit 33 is another power cylinder 116, in which works a piston 117 connected to a lever 118 which is in turn connected to one end of a control rod 119. The control rod 119 connects the control lever 52 to the control valve 51 and has linkage 120 connecting it to the throttle 121 of the engine 26. When the vehicle begins to climb a hill the pressure in the main conduit 33 rises and the control rod 119 is moved by the piston 117 to turn the valve 51 in the direction which will shift the sliding element on each operating lever to a lower position, shortening the stroke. At the same time the engine is speeded up by the rod 119 opening the throttle 121 causing more pumping action at a greater degree of power. A spring 122 normally balances the pressure in the main conduit 33. The check valve 34 in the bypass conduit 33b acts as a "hill holder" in normal forward driving.

Referring to Figures 24 and 25, the braking valve 42 is shown in detail, showing balanced valve heads 123 and 124 carried on the valve stem 112 so that the fluid pressure on either side of the valve heads can either open or close the valve to the fluid flowing from the conduit 41 to the return conduit 125 leading to the tank 32.

The tank 32 may conveniently be a part of the casing 54 as shown in Figure 2.

A conduit 126 connects the tank 32 with the head of each inlet valve on the pump cylinders to convey fluid which may leak past the valve back to the tank. In operation, the lever 88 is put in either "neutral" or "park" position and the engine 26 is started. The engine may be allowed to warm up if necessary, the stroke of the piston in each pump cylinder being kept at zero stroke. The lever 88 is then moved to "forward" and the lever 52 is moved to shift the sliding element on each operating lever upwardly. Fluid will be pumped to the fluid motor under great pressure and the vehicle will move. The spring 113 will return the brake pedal in the direction of the arrow shown in Figure 1 when the pressure of the foot is taken off the brake pedal 108, closing the valve 42 and slowing down the vehicle.

The fluid motor 27 may be a single motor mounted on the differential shown in Figure 1 or may be separate motors mounted one each on the front and rear wheels.

Upon great resistance to flow of the fluid through the motor 27, as in climbing a hill, the power cylinder 116 will control the throttle 121 and also will operate the piston 44 within the cylinder 43 to shift the sliding element on each operating lever downwardly to shorten the stroke and increase the power of the fluid flowing to the fluid motor.

While only three cylinders are shown on each side of the casing, any number of cylinders may be connected in tandem using the principles of the present invention.

What is claimed is:

In a motor vehicle, the combination with an engine having a throttle, of a variable stroke fluid drive mechanism connected to the engine, said mechanism comprising a casing, at least one pair of opposed pump cylinders projecting transversely of said casing intermediate the ends thereof, inlet and outlet ports in each of said cylinders, conduits connecting in communication with said ports, a piston working in each of said cylinders, a plurality of piston rods within said casing each having one end connected to an adjacent one of said pistons for reciprocating movement therewith, a lever within said casing having one end pivotally connected to said casing for swinging movement toward and away from said cylinders, crank means operatively connecting the other end of said lever to said engine for effecting the swinging movement of said lever, means carried on said lever connected to the other end of said associated piston rod for effecting reciprocating movement of said piston rods upon execution of swinging movement of said lever, said means being adjustably slidable on said lever intermediate the ends thereof so that the length of the reciprocating movement of said piston may be varied from zero stroke to maximum stroke, and means responsive to the pressure of fluid in said conduits operatively connected to said lever for effecting the sliding movement of said adjustably slidable means on said lever, said last named means being in fluid communication with said outlet conduit and operable upon an increase of pressure in said outlet conduit to effect a reduction in the length of stroke of said pistons and being operatively connected with the throttle of said engine to effect opening of the throttle of said engine upon an increase in pressure in said last named conduit.

References Cited in the file of this patent

UNITED STATES PATENTS

| | | |
|---|---|---|
| 1,172,412 | Von Saalfeld | Feb. 22, 1916 |
| 1,259,090 | Ferris et al. | Mar. 12, 1918 |
| 1,813,078 | Nyrop | July 7, 1931 |
| 2,259,587 | Rush | Oct. 21, 1941 |
| 2,338,021 | Bennett | Dec. 28, 1943 |
| 2,370,710 | Blair | Mar. 6, 1945 |
| 2,514,674 | Schorn | July 11, 1950 |
| 2,548,738 | Orlich et al. | Apr. 10, 1951 |
| 2,646,751 | Erikson | July 28, 1953 |
| 2,690,712 | Foote | Oct. 5, 1954 |

FOREIGN PATENTS

| | | |
|---|---|---|
| 463,894 | France | Dec. 29, 1913 |
| 661,717 | Germany | June 25, 1938 |